United States Patent [19]
Fatehi

[11] Patent Number: 4,878,726
[45] Date of Patent: Nov. 7, 1989

[54] OPTICAL TRANSMISSION SYSTEM
[75] Inventor: Mohammad T. Fatehi, Middletown, N.J.
[73] Assignees: American Telephone and Telegraph Company, New York, N.Y.; AT&T Bell Laboratories, Murray Hill, N.J.
[21] Appl. No.: 269,289
[22] Filed: Nov. 10, 1988
[51] Int. Cl.$^4$ .............................................. G02B 6/26
[52] U.S. Cl. .............................. 350/96.15; 350/96.16
[58] Field of Search ............... 350/96.15, 96.13, 96.16, 350/96.10

[56] References Cited
U.S. PATENT DOCUMENTS 4,705,350 11/1987 Cheng .............................. 350/96.16
4,755,016 7/1988 DeLoach, Jr. et al. ..... 350/96.15 X
4,777,433 10/1988 Steele et al. ................. 350/96.15 X

OTHER PUBLICATIONS

Integrated Optical Circuits and Components Design and Application Edited by Lynn D. Hutcheson, p. 177, FIG. 6.2 and p. 221, FIG. 6.30, Published by Marcel Dekker, Inc., New York and Basel.

Primary Examiner—William L. Sikes
Assistant Examiner—Phan T. Heartney
Attorney, Agent, or Firm—Eli Weiss

[57] ABSTRACT

To prevent an interruption of service due to a break in an optical fiber, the information being transmitted is normally sent along two diversely routed lightwave paths using two complete transmitter sections, one for each path. Briefly, in this invention a single optical transmitter which can be an optical modulator such as a lithium niolate switch is used to impress a digital signal on a CW optical beam to obtain two digital optical outputs. One output is normally used as the modulated line signal for one of two diversely routed paths. The other output, which is the complement of the modulated signal, is used as the modulated line signal for the other of the two diversely routed paths. When the complement of the signal is detected, complementation can be performed to retrieve the original bit pattern. The advantages over the prior art are significant. For example, only one tansmitter is required. The laser is on continuously and, therefore, there is no chirp. The power (average) is directed 50% of the time to one output and 50% of the time to the other output. Thus, power loss is at a minimum.

6 Claims, 4 Drawing Sheets

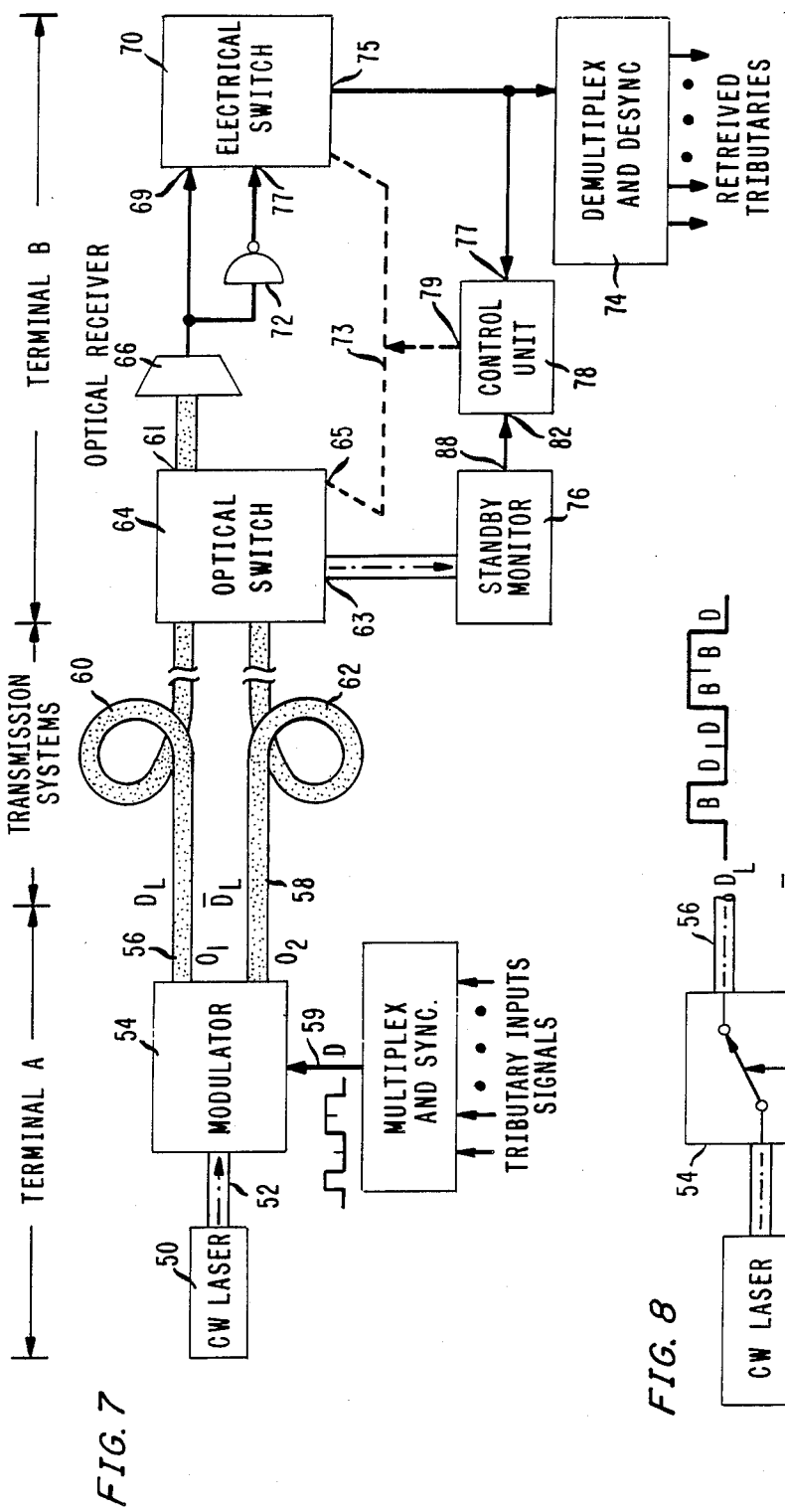
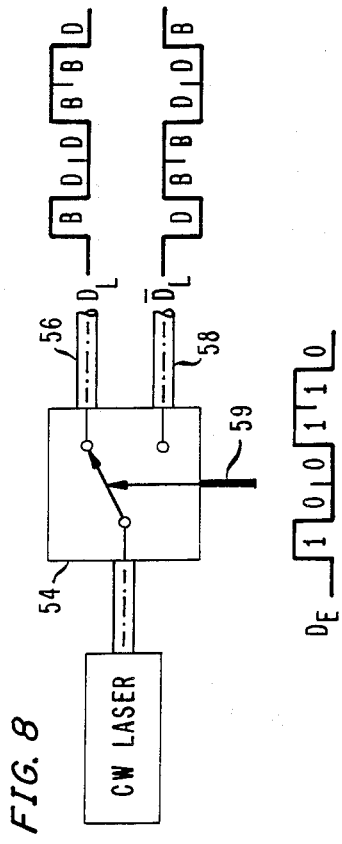
FIG. 7
FIG. 8

OPTICAL TRANSMISSION SYSTEM

TECHNICAL FIELD

This invention relates generally to fail-safe or survivable networks for transmitting optical signals, and more specifically, to an electro-optic device for providing an improved optical fiber telecommunications network.

BACKGROUND OF THE INVENTION

Many communications carriers, companies, government agencies and corporations that transmit data from one location to another have an interest in providing or having provided for them uninterrupted transmission of data between two distant locations via optical fiber. Currently, to avoid an interruption of service caused by a break in an optical fiber, separate and distinct lightwave paths are utilized. For example, at the transmitting end, a fiber line is split into two, and each of the two fiber links transverse physically diverse paths to a remote destination. At the receiving end, the optical signal in one of the two fibers is selected for use. If, for any reason, there is an interruption in the received signal, a receiver at the receiving end is switched to receive the optical signal from the other or standby line to avoid a partial or complete loss of information for a long period of time. Normally, in standard lightwave systems, terminals, regenerators and other equipment are IXN protected. Thus, a major cause of signal interruption for long duration would be a break in the fiber cable.

Diverse routing can be achieved by one of the following two methods: (A) The use of two physically separate optical fibers to transmit the same signal simultaneously along both paths. This system requires the use of duplicate transmitters, receivers, multiplexers, and the like—one of each for each fiber path; or, (B) By coupling the optical signal from the transmitter into a fused-fiber 3 dB splitter and then connecting the two outputs of the 3 dB splitter to two separate optical fibers. At the receiver site, a simple 2×2 electromechanical optical switch (or even a lithium niobate switch) can be used to select the optical fiber from which the signal is to be utilized.

Obviously, the use of a single 3 dB splitter is more economical than the use of the various components for two separate and complete transmitting and receiving systems. However, a main disadvantage of the use of a 3 dB splitter is that it introduces a loss which is excessive for the loss budget provided by most optical systems. Thus, as diverse routing is normally added to existing lightwave systems, the use of 3 dB splitters for diverse routing can create serious signal level related problems.

SUMMARY OF THE INVENTION

In this invention, a directional coupler modulator which has a true output signal and a complement output signal is used to minimize the 50% signal loss associated with 3 dB splitter in lightwave systems equipped with external modulators. The directional coupler modulator, which can comprise a lithium niobate switch, modulates an optical beam with a digital signal. The directional coupler modulator has an optical input port, two optical output ports and an electrical control input port. Normally, energy from a laser operating in CW mode is fed to the optical input port. This signal is then modulated by the electrical signal applied to the electrical input port, and a modulated optical signal appears at each of the two optical output ports. The signal on one output port is a true signal, and the signal on the other output port is its complement. There is no 3 dB splitting loss of optical energy. The true modulated optical output signal is coupled to one optical fiber and the complement signal is coupled to the other optical fiber. The receiver is normally coupled to receive the true signal. In the event of a failure, the receiver is switched to the other fiber to receive the complementary signal. An inverter converts the complementary signal to a true signal. Thus, with this invention, the loss producing 3 dB splitters are eliminated in 1+1 lightwave systems which utilize external modulators.

BRIEF DESCRIPTION OF THE DRAWING

In the drawing:

FIG. 7 illustrates a diverse route optical system in accordance with the principles of the invention; and FIG. 8 illustrates the operation of the modulator.

DETAILED DESCRIPTION

Figure 1:
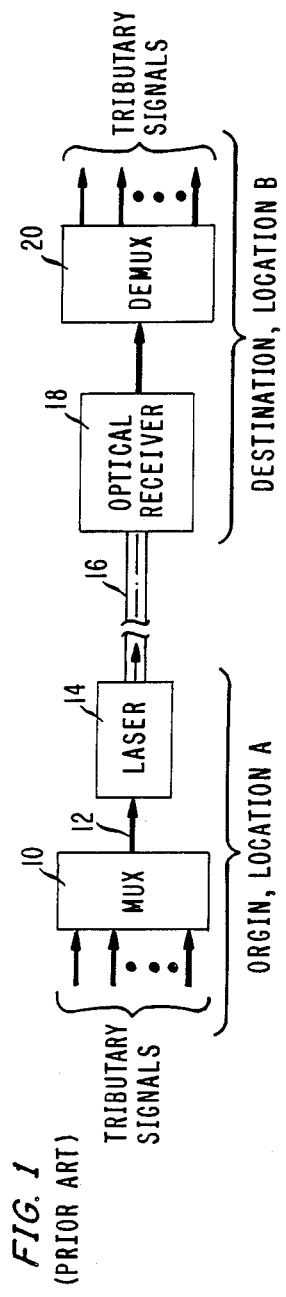
FIG. 1 is an illustration of a typical lightwave system.

Referring to FIG. 1, there is illustrated a typical lightwave system. Normally several low rate (tributary-rate) electrical digital signals are multiplexed together in multiplexer 10 to generate a high capacity linerate electrical signal at the output port. The tributary rate signals can be multiplexed together by bit interleaving or block interleaving to generate the high capacity line rate signal. The multiplexed digital electrical signal is transmitted over line 12 to an input port which modulates a laser beam by turning the output signal of laser 14 "on" or "off" according to the data. The modulated output of the laser is coupled into a fiber optic transmission line 16 (usually a single mode fiber) for transmission to a remote location.

At the remote location, the optical data, in digital form, is detected by an optical receiver 18 and converted to an electrical signal. The electrical signal is amplified, retimed and reshaped. Thereafter, the signal is fed to demultiplexer 20 where it is demultiplexed into its tributary rate components to recover the original tributary rate digital signals. The laser 14, the optical receiver 18 and the multiplexing electronics are referred to, collectively, as the line terminating equipment.

To be cost effective, lightwave transmission systems are normally designed to transmit the maximum signal bit rate along the maximum distance possible before requiring a signal regeneration equipment. With no signal regeneration, the capacity and the length of a fiber transmission path is limited by two factors: system loss and dispersion. The system loss is governed by the power of the signal from the transmitter, the sensitivity of the receiver, and the losses in the fiber and in the various components such as connectors, etc. that are part of the transmission path. Dispersion characteristics of optical fiber also limits the length of a fiber transmission path. If a light source does not have a single frequency, the dispersion causes the light pulse to broaden as it travels down the fiber, and this broadening of the light pulse will reduce the maximum bit rate that can be transmitted. In addition, dispersion reduces the amplitude of a pulse signal and, therefor, appears as attenuation to effectively reduce the maximum length over which an optical signal can be transmitted. Thus, to minimize optical signal impairment due to dispersion, the laser source should be operated with the shortest bandwidth or frequency variation (chirp) possible.

Figure 2:
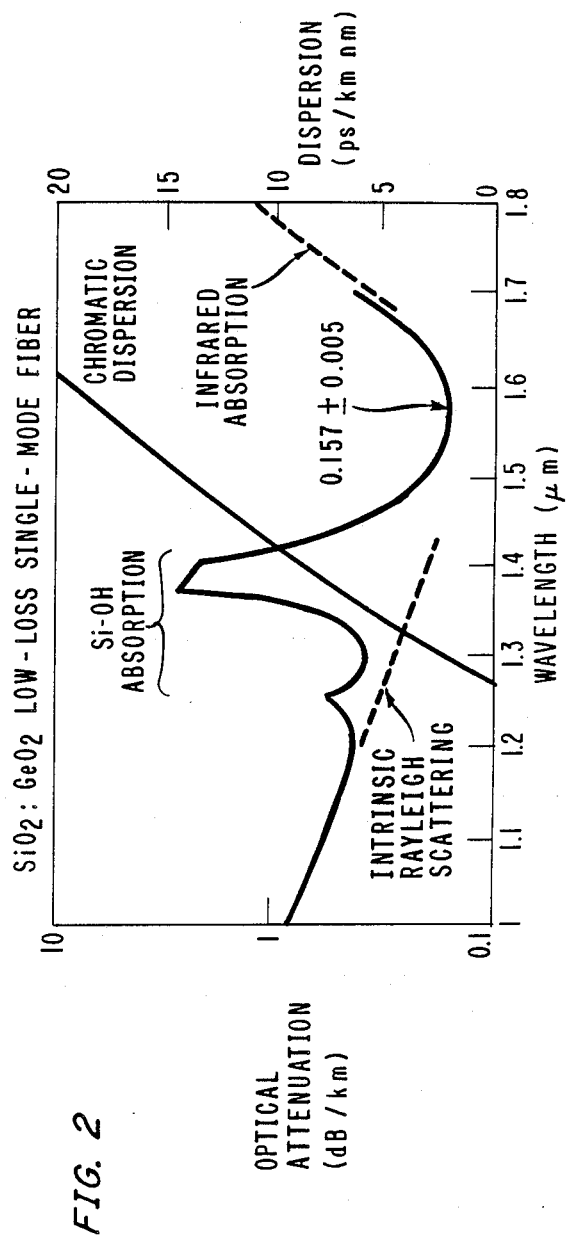
FIG. 2 is an illustration of typical attenuation and dispersion characteristics of a silica single mode fiber as a function of the wavelength of the carrier light.

Typical attenuation and dispersion characteristics of a single mode fiber as a function of the wavelength of the carrier light is illustrated in FIG. 2. It is to be noted that the attenuation characteristic shows that there is minimum loss in the wavelength region of approximately 1.55 μm. Unfortunately, at this wavelength, the dispersion is significantly high and at high bit rates, the maximum length of fiber is limited by this phenomenon rather than by loss. The second minimum in the attenuation curve is at approximately 1.31 μm. Currently, most optical systems operate in this wavelength region.

Currently, internal modulation is used to modulate semiconductor lasers. Thus, the laser is turned "on" or "off" according to the presence or absence of bits in the modulating data stream as illustrated in FIG. 1. In operation, even when the laser is biased at a point to minimize wavelength broadening, turning the laser on and off introduces a few Angstroms of wavelength variations normally referred to as "chirps". Regardless of how close the laser beam is to a single frequency, chirp causes an increase in bandwidth which, in turn, causes dispersion in long-haul transmission systems.

Figure 3:
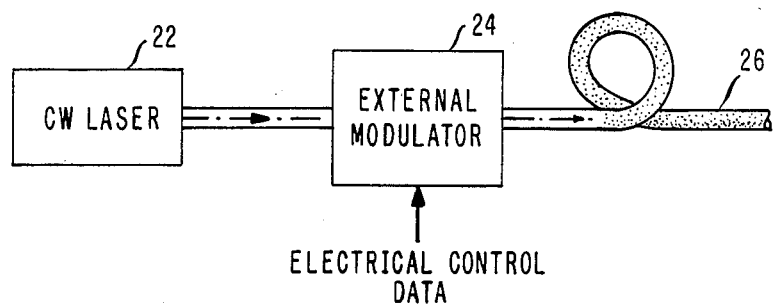
FIG. 3 illustrates external modulation of the output of a CW mode laser.

As an alternative to turning the laser on and off to modulate the data, the digital signal can be modulated onto the lightwave by means of an external modulator. Referring to FIG. 3, an unmodulated laser 22, which operates in the CW mode is coupled, via a connecting fiber, to an external modulator 24. The output of the external modulator is connected to an optical transmission fiber 26. Electrical data for modulating the optical beam from the laser is coupled to a control port of the external modulator.

Use of an external modulator permits the laser to operate in its CW mode and at its characteristic wavelength. The advantages of using an external modulator are as follows: (A) the operation of the laser is more stable; (B) the occurrence of chirps is reduced; (C) the design of the laser is not influenced by modulation problems and, therefore, the laser can be designed for stability; and (D) the use of an external modulator enables the phase of the light from the laser to be preserved. This last feature is essential in systems which utilize phase shift keying (PSK) modulation techniques. The disadvantages of using an external modulator are that the modulator is an additional device in the system and that there are insertion losses associated with placing the modulator in the system.

Figure 4:
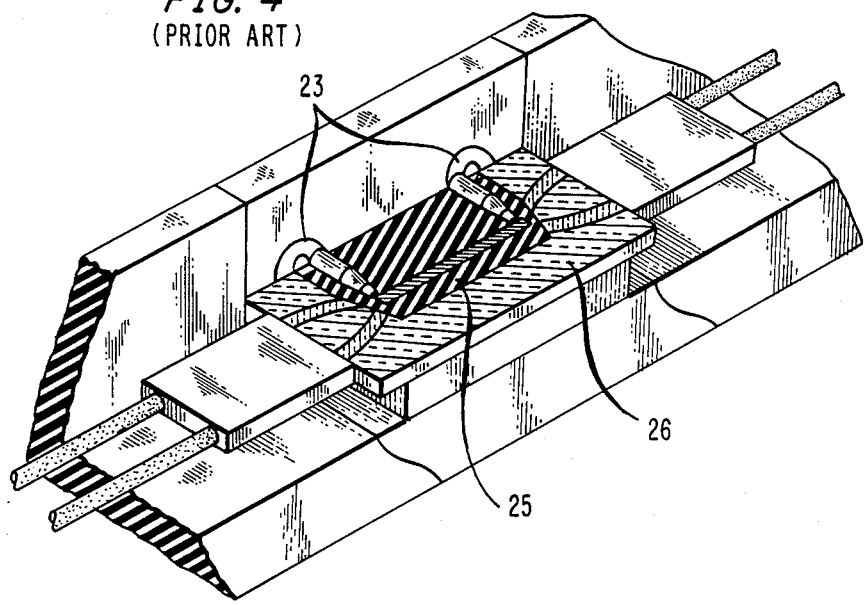
FIG. 4 illustrates a lithium niobate directional coupler modulator.

Lithium niobate (LiNbO$_3$) directional coupler modulators can be used as optical cross-over switches and high speed external optical modulators. Referring to FIG. 4, there is illustrated a schematic drawing of a directional coupler modulator. The device consists of a directional coupler formed from two identical waveguides brought into proximity 26 and a traveling wave electrode 25 which, with its input terminal 23, is used to electro-optically control the coupler state. Briefly, the coupler is normally designed with an interaction length corresponding to one coupling length. In this instance, the coupler is in the crossover state without an application of a voltage to the port 23. The coupler can be switched to the straight-through state when the proper voltage is applied to the port. Functionally, the directional coupler can be represented as a cross-over switch and, is basically a high speed electrically operated 2×2 optical switch. Light on an input fiber is coupled to the cross output fiber when there is no voltage at the control port; and is coupled to the direct output fiber when a voltage is applied at the electrical control input port.

Figure 5:
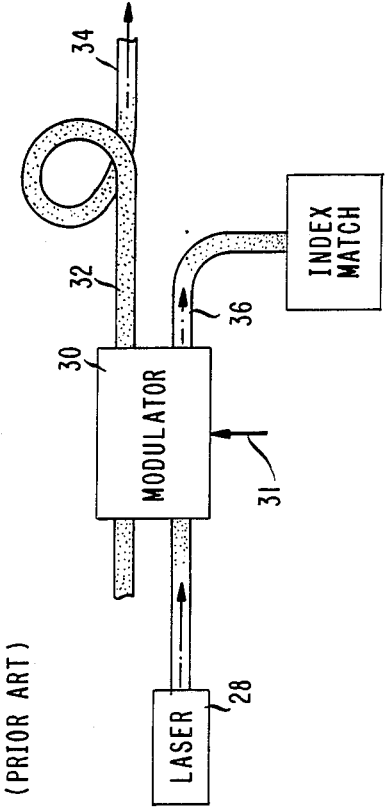
FIG. 5 illustrates an optical system equipped with a lithium niobate external modulator.

FIG. 5 illustrates a typical optical transmission system which uses an external modulator to transmit data over a single path. In operation, laser 28 is on continuously and, therefor, can operate at or close to a single frequency. Normally, the optical energy from the laser is transmitted through the modulator 30 to output fiber 32, and then into optical transmission fiber 34 when the value of the digital data coupled to the electrical control input port 31 is a binary "0". The occurrence of a binary "1" at the electrical control input port 31 causes the light from the laser to switch from output fiber 32 to output fiber 36. Light on fiber 36 travels directly into an index matching fluid which absorbs the light energy received.

If the unused energy of output fiber 36 is not terminated into the index matching fluid, undesired optical reflections can occur. Thus, in operation, in the system disclosed in FIG. 5, optical energy is lost approximately 50% of the time.

Figure 6:
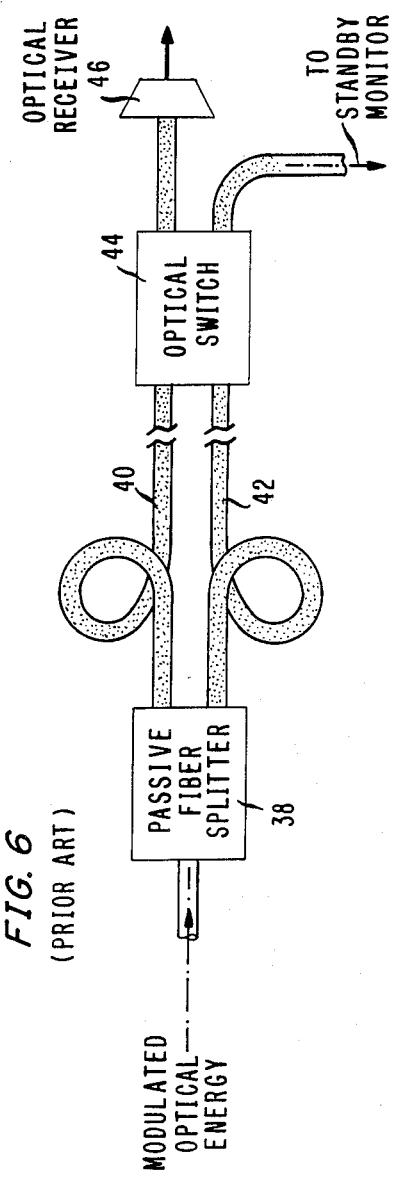
FIG. 6 illustrates a typical diverse route optical system.

As noted in the Background of the Invention, currently, to avoid an interruption of service, separate and distinct lightwave paths are being proposed or utilized. FIG. 6 illustrates, in simplified form, what can be considered to be a typical diverse route optical system using a directional coupler to generate a modulated light beam and a 3 dB splitter to divide the modulated light beam into two beams for transmission along two separate optical paths. Optical energy, modulated to contain information which is to be transmitted, is directed to a 3 dB splitter 38. Splitter 38 directs one-half of the received optical energy to an optical fiber 40 which follows a first route to a destination; and, splitter 38 directs the remaining one-half of the received optical energy to an optical fiber 42 which follows a second route to the same destination. Each fiber 40, 42 terminates at a 2×2 optical switch 44. One output fiber of the 2×2 optical switch is coupled to an optical receiver and demodulator 46 which converts the received optical signal into an electrical signal for demultiplexing or regeneration and transmission to its ultimate destination. The other output fiber of the 2×2 optical switch is coupled to a standby monitor. Let's assume that, under normal operation, the switch 44 in its cross-state, the receiver input port is connected to fiber 42 and the signal in fiber 40 is monitored as standby. Upon the occurrence of a break in fiber 42, the 2×2 switch 44 is activated and the receiver and demodulator 46 is switched from defective fiber 42 to good fiber 40.

A major problem with the system illustrated in FIG. 6 is that the end switch loss (the 2×2 switch 44) is typically of the order of 1 dB, and the front end splitter 38 has a loss which is more than 3 dB. This last mentioned loss is primarily due to the fact that one-half of the power received by the 3 dB splitter is sent to each of the two fibers.

Referring to FIG. 7, there is illustrated structure in accordance with the principles of this invention. It is to be noted that the need for a loss producing 3 dB splitter is eliminated. A laser 50, which operates in its CW mode, is coupled to an optical fiber input 52 of a directional coupler modulator 54 which has first 56 and second 58 optical fiber ports, and an electrical control input port 59. The electrical signal on port 59 is a digital signal which contains all the tributary signals multiplexed at the line-rate.

Optical fiber output 56 is connected to an optical fiber transmission path 60; and, optical fiber 58 is connected to a separate and distinct optical fiber transmission path 62. The two optical fiber transmission paths 60, 62 terminate in a 2×2 optical switch 64 which supports two optical output paths 61, 63 and an electrical control port 65. In normal operation, when there is no electrical signal on control part 65, switch 64 is in its cross-state such that the optical signals on optical fiber 62 pass through the switch to output fiber 61, and optical signals on optical fiber 60 pass through the switch to output fiber 63. Application of an electrical signal to control port 65 conditions switch 64 to assume its bar or straight through condition which causes the optical signal on fiber 60 to appear on fiber 61. Switch 64 maintains its straight through condition for the duration of the control signal. The signal from one of the optical fibers, in this instance, fiber 62, is coupled through fiber 61 to an optical receiver 66 for conversion to its equivalent electrical signal when there is no control signal on control signal port 65. The output of optical receiver 66 is coupled directly to one input port 69 of an electrical or electronic 2×1 or 2×2 switch 70. The output of the optical receiver 66 is also coupled through an inverter (NOT gate) 72 to a second input port 71 of switch 70. An output port 75 of switch 70 is connected to demultiplexer and desynchronizer network 74 to recover the original tributary rate signals.

Output port 75 of switch 70 is also connected to an input port 77 of a control unit 78. An output port 79 of control unit 78 is coupled to feed an electrical control signal to control input ports of optical switch 64 and switch 70. The occurrence of an electrical control signal on port 79 operates switch 64 to pass the optical signal on the standby line (in this instance optical fiber transmission path 60) to the optical receiver 66, and also operates switch 70 to pass the electrical signal on the complementary input port (in this instance input port 77) to the output port 75.

The alternate output fiber 63 of switch 64 is coupled to a standby monitor 76 which monitors the standby optical signal on optical fiber. An output port 88 of standby monitor 76 is coupled to an inhibit port 82 on control unit 78. Standby monitor 76, upon sensing that the standby optical signal on the alternate route is either defective or absent, generates an electrical signal which prevents control unit 78 from operating to switch the system to a defective alternate optical cable route.

In operation, optical energy from the laser 50, which is designed to operate in its CW mode, is directed to and modulated by the electrical signal on control input port 54 of directional coupler modulator 54. Referring to FIG. 8, if the electrical input signal is the digital data $D_E$, then the modulated light $D_L$ which corresponds to the bit pattern in $D_E$ will appear on output optical fiber 56. If it is assumed that the occurrence of a potential on control port 59 represents a "1", then the occurrence of "light" (indicated by "B" for bright) represents a "1" and the absence of "light" (indicated by "D" for Dark) represents a "0". In the operation of the lithium niobate directional coupler modulator, the optical signal on fiber output 58 is the logical one's complement of the optical signal on the fiber output 56. Thus, the optical signal on output fiber 58, is the complement of the input electrical signal $D_E$ and is illustrated in FIG. 8 as $\overline{D}_L$. Returning again to FIG. 7, in operation, the optical signal which is carried on fiber 62 corresponds to the electrical signal on the control input port 59, and its complement is carried on fiber 60. Thus, the "true" modulated signal is transmitted via the normally used optical transmission path 62 and the "complement" of the true modulated signal is transmitted via the alternate optical transmission path 60.

The two signals are transmitted simultaneously on both routes and, during normal operation, the true optical signal is routed, via optical switch 64, to the optical receiver 66 where it is converted to an electrical signal. The output of the optical receiver is transmitted directly through electrical switch 70 to the demultiplexer and de-synchronizer circuit 74 and to control unit 78. In the event of a break in optical fiber 62, control unit 70 detects the absence of signals or increased error rate from the signal on port 75 of electrical switch 70 and, simultaneously activates switches 64, 70. Regardless of which route is used to carry the signal, the two switches operate such that the inverter is connected at the appropriate time to insure that the proper digital signal is always present at the output 75 of switch 70. As noted above, if the optical signal on the alternate fiber optical path 60 is defective when the optical signal on the normal fiber optics path is defective, standby monitor 76 will present the central unit from operating.

Clearly, the invention disclosed for providing failsafe or survivable networks for optical signals can be used with any architecture where a fiber splitter normally follows an externally modulated laser. Thus, the invention can be used to provide fail-safe protection for lightwave transmission lines. It can also be used to provide fail-safe protection for terminal and regenerator, and other equipment used for the transmission of optical signals by selectively switching the optical signal to duplicate equipment when the original equipment fails. It can also be used to provide redundant (1+1) protection for all critical components which may be used therein; and, it can be used to simplify protection switching in dual-fabric photonic cross-connects, if input ports of such units are equipped with optical regenerators or transmitters. When the term light, optical or optical energy is used in this application, it is to be understood that it encompasses photon energy which can be in the range which extends from infrared through ultraviolet, or any other wavelength in the electromagnetic spectrum which can be transmitted via a fiber.

This invention can also be used, if an external modulator is used, for modulating digital signals by frequency shift keying (FSK) techniques where two different laser wavelengths $\lambda_1$ and $\lambda_2$ are used to represent the ones and zeros in the digital system. The alternate path in this case would carry the complement of the signal where assignment of $\lambda_1$ and $\lambda_2$ to the logic levels of "one" and "zero" are reversed. The same electro-optic circuit described above can be used to recover the original signal at the destination.

I claim:

1. An optical network comprising
a laser for generating optical energy,
a directional coupler modulator having a control port coupled to simultaneously transmit optical signals to a first output port and the complement of said optical signal to a second output port,
a first transmission network coupled to receive the optical energy from said first port,
a second transmission network coupled to receive the complementary optical energy from said second port,
an optical receiver for converting received optical signals to electrical signals,
an optical switch coupled to said first and second transmission networks to pass only the optical signal on said first transmission network to said optical receiver, and
control means coupled to selectively activate said optical switch to pass only the optical signal on said second transmission network to said optical receiver.

2. The optical network of claim 1 further comprising an electrical switch having a first input terminal coupled to receive the output signal from said optical receiver, a second input terminal coupled to receive the output signal from said optical receiver through an inverter, and an output port normally coupled to receive the signal on said first input port; said electrical switch being coupled to said control means to selectively switch the output port from said first input port to said second input port when said control means selectively activates said optical switch.

3. The optical network of claim 2 further comprising monitor means interposed between said optical switch and said control unit coupled to prevent the control means from activating the optical switch and the electrical switch when the optical signal on the second transmission network indicates a defect in said second transmission network.

4. The optical network of claim 3 wherein said optical switch comprises an optical 2×2 directional coupler switch.

5. The optical network of claim 4 wherein said first and second transmission network comprises optical fiber.

6. The optical network of claim 5 wherein said laser is coupled to operate in its CW mode, said directional coupler modulator is coupled to modulate the optical energy from said laser, and said control port of said directional coupler is coupled to receive an electrical signal representative of data to be modulated onto said laser beam.

* * * * *